US008255644B2

(12) United States Patent
Sonnier et al.

(10) Patent No.: US 8,255,644 B2
(45) Date of Patent: Aug. 28, 2012

(54) NETWORK COMMUNICATIONS PROCESSOR ARCHITECTURE WITH MEMORY LOAD BALANCING

(75) Inventors: David P. Sonnier, Austin, TX (US); Michael R. Betker, Orefield, PA (US)

(73) Assignee: LSI Corporation, Milpitas, CA (US)

( * ) Notice: Subject to any disclaimer, the term of this patent is extended or adjusted under 35 U.S.C. 154(b) by 254 days.

(21) Appl. No.: 12/782,393

(22) Filed: May 18, 2010

(65) Prior Publication Data

US 2010/0293345 A1    Nov. 18, 2010

Related U.S. Application Data

(60) Provisional application No. 61/179,202, filed on May 18, 2009.

(51) Int. Cl.
*G06F 12/00* (2006.01)
*G06F 12/08* (2006.01)

(52) U.S. Cl. ............... 711/154; 711/203; 711/E12.001; 711/E12.017; 370/403; 710/100

(58) Field of Classification Search .................. None
See application file for complete search history.

(56) References Cited

U.S. PATENT DOCUMENTS

| | | | | |
|---|---|---|---|---|
| 4,622,631 A * | 11/1986 | Frank et al. | ........... | 711/120 |
| 6,038,630 A * | 3/2000 | Foster et al. | ........... | 711/150 |
| 6,567,564 B1 * | 5/2003 | van der Wal | ........... | 708/308 |
| 7,461,208 B1 * | 12/2008 | Caprioli et al. | ........... | 711/128 |
| 2002/0029214 A1 * | 3/2002 | Yianilos et al. | ........... | 707/7 |
| 2002/0165985 A1 * | 11/2002 | Chen et al. | ........... | 711/147 |
| 2003/0033276 A1 * | 2/2003 | Cheng et al. | ........... | 707/1 |
| 2003/0115417 A1 * | 6/2003 | Corrigan | ........... | 711/118 |
| 2004/0255209 A1 * | 12/2004 | Gross | ........... | 714/710 |
| 2007/0016756 A1 * | 1/2007 | Hsieh et al. | ........... | 711/216 |
| 2007/0226798 A1 * | 9/2007 | Sibert | ........... | 726/22 |
| 2008/0162793 A1 * | 7/2008 | Chu et al. | ........... | 711/103 |
| 2010/0293312 A1 * | 11/2010 | Sonnier et al. | ........... | 710/107 |
| 2010/0293353 A1 * | 11/2010 | Sonnier et al. | ........... | 711/170 |
| 2011/0225334 A1 * | 9/2011 | Byrne et al. | ........... | 710/110 |
| 2011/0225337 A1 * | 9/2011 | Byrne et al. | ........... | 710/306 |
| 2012/0005391 A1 * | 1/2012 | Byrne et al. | ........... | 710/313 |

FOREIGN PATENT DOCUMENTS

JP        H02-271444 A    * 11/1990

* cited by examiner

*Primary Examiner* — Jasmine Song
*Assistant Examiner* — Daniel Bernard

(57) ABSTRACT

Described embodiments provide a memory system including a plurality of addressable memory arrays. Data in the arrays is accessed by receiving a logical address of data in the addressable memory array and computing a hash value based on at least a part of the logical address. One of the addressable memory arrays is selected based on the hash value. Data in the selected addressable memory array is accessed using a physical address based on at least part of the logical address not used to compute the hash value. The hash value is generated by a hash function to provide essentially random selection of each of the addressable memory arrays.

12 Claims, 11 Drawing Sheets

300

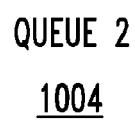
FIG. 10
| QUEUE 1 | QUEUE 2 | | 1008 |
|---|---|---|---|
| 1002 | 1004 | | |
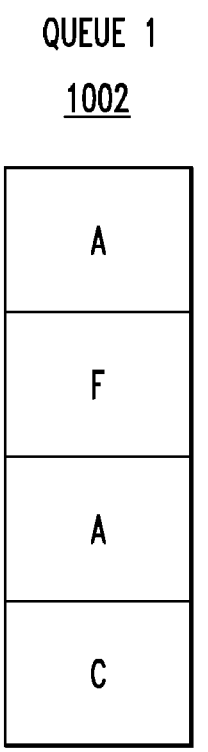
| FLOW ID OF NEXT TASK TO ARRIVE | ASSIGNED QUEUE |
|---|---|
| A | QUEUE 1 |
| D | QUEUE 2 |
| Q | QUEUE 2 |

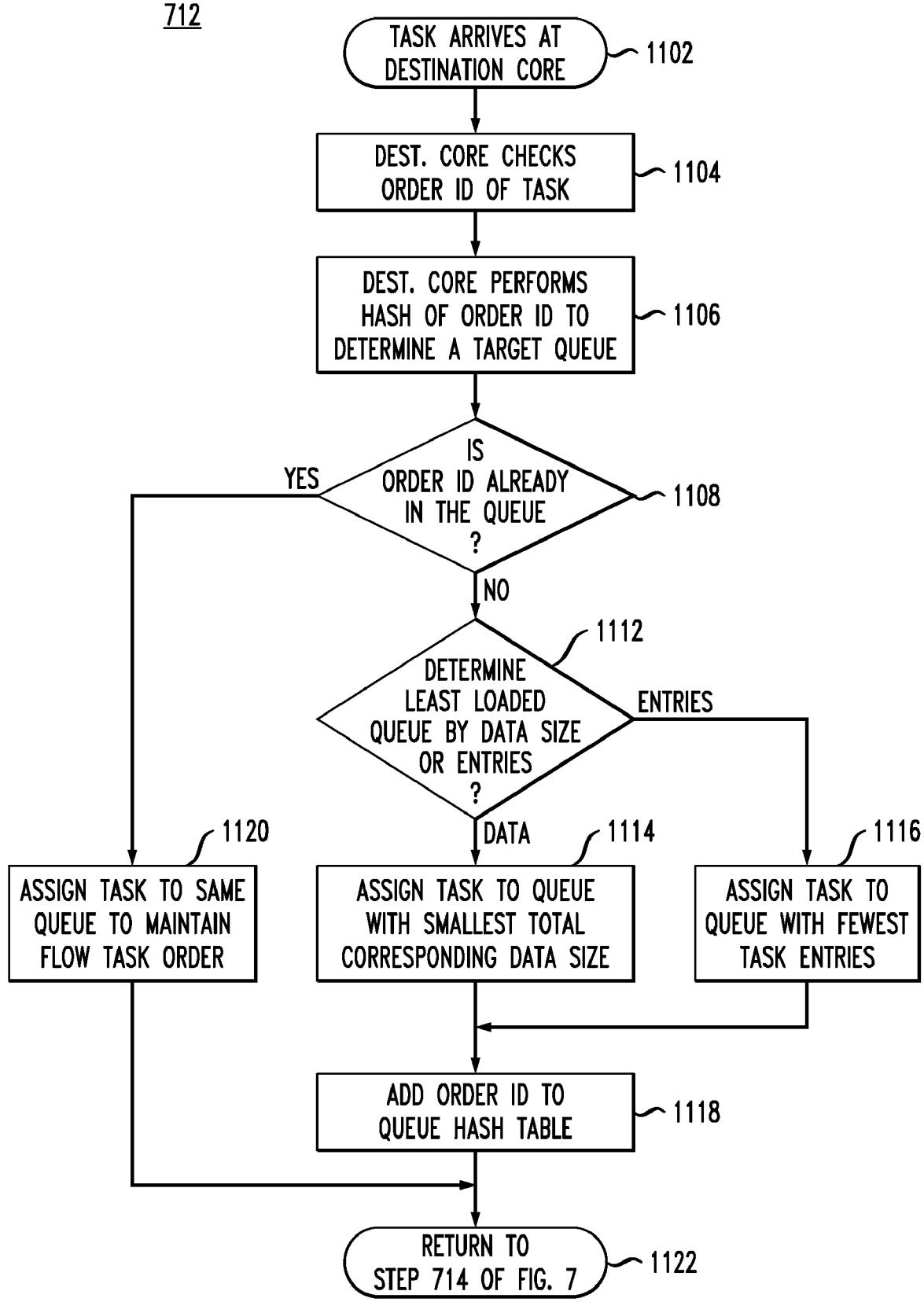

NETWORK COMMUNICATIONS PROCESSOR ARCHITECTURE WITH MEMORY LOAD BALANCING

CROSS-REFERENCE TO RELATED APPLICATIONS

This application claims the benefit of the filing date of U.S. provisional application No. 61/179,202 filed 18 May 2009 the teachings of which are incorporated herein in their entireties by reference.

The subject matter of this application is related to U.S. patent application Ser. Nos. 12/430,438 filed 27 Apr. 2009, 12/729,226 filed 22 Mar. 2010, 12/729,231 filed 22 Mar. 2010, 12/782, 379, filed 18 May 2010, and 12/782,411, filed 18 May 2010, the teachings of all of which are incorporated herein in their entireties by reference.

BACKGROUND OF THE INVENTION

1. Field of the Invention

The present invention relates to processor systems and, more specifically, to an accelerated processor architecture for network communications.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall Network Processor throughput. Newer designs add hardware accelerators to offload certain tasks from the general-purpose processors, such as encryption/decryption, packet data inspections, etc. These newer Network Processor designs are traditionally implemented with either i) a non-pipelined architecture or ii) a fixed pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by the using accelerators.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a memory system including a plurality of addressable memory arrays. Data in the arrays is accessed by receiving a logical address of data in the addressable memory array and computing a hash value based on at least a part of the logical address. One of the addressable memory arrays is selected based on the hash value. Data in the selected addressable memory array is accessed using a physical address based on at least part of the logical address not used to compute the hash value. The hash value is generated by a hash function to provide essentially random selection of each of the addressable memory arrays.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 10 shows a block diagram of exemplary task queues, in accordance with embodiments of the present invention; and FIG. 11 shows a flow diagram of an exemplary task queuing process, in accordance with embodiments of the present invention.

DETAILED DESCRIPTION

In accordance with embodiments of the present invention a memory system is provided that includes a plurality of addressable memory arrays. Data in the arrays is accessed by receiving a logical address of data in the addressable memory array and computing a hash value based on at least a part of the logical address. One of the addressable memory arrays is selected based on the hash value. Data in the selected addressable memory array is accessed using a physical address based on at least part of the logical address not used to compute the hash value. The hash value is generated by a hash function to provide essentially random selection of each of the addressable memory arrays.

Table 1 defines a list of acronyms employed throughout this specification as an aid to understanding the described embodiments of the present invention:

TABLE 1

| | |
|---|---|
| USB | Universal Serial Bus |
| SATA | Serial Advanced Technology Attachment |
| SCSI | Small Computer System Interface |
| SAS | Serial Attached SCSI |
| PCI-E | Peripheral Component Interconnect Express |
| SoC | System-on-Chip |
| AXI | Advanced eXtensible Interface |
| AMBA | Advanced Microcontroller Bus Architecture |
| PAB | Packet Assembly Block |
| MTM | Modular Traffic Manager |
| RegEx | Regular Expression |
| PIC | Protocol Integrity Checker |
| IP | Internet Protocol |
| TCP | Transmission Control Protocol |
| EF | Expedited Forwarding |
| BE | Best Effort Forwarding |
| FIFO | First-In, First-Out |
| I/O | Input/Output |
| DDR | Double Data Rate |
| DRAM | Dynamic Random Access Memory |
| MMB | Memory Manager Block |
| MAI | Microprocessor Access Interface |
| PLB | Processor Local Bus |
| MPP | Modular Packet Processor |
| AAL5 | ATM Adaptation Layer 5 |
| SED | Stream Editor |
| SPP | Security Protocol Processor |
| CRC | Cyclic Redundancy Check |
| UDP | User Datagram Protocol |
| diffserv | Differentiated Services |
| AF | Assured Forwarding |
| IPS | Internet Provider Security |

Figure 1:
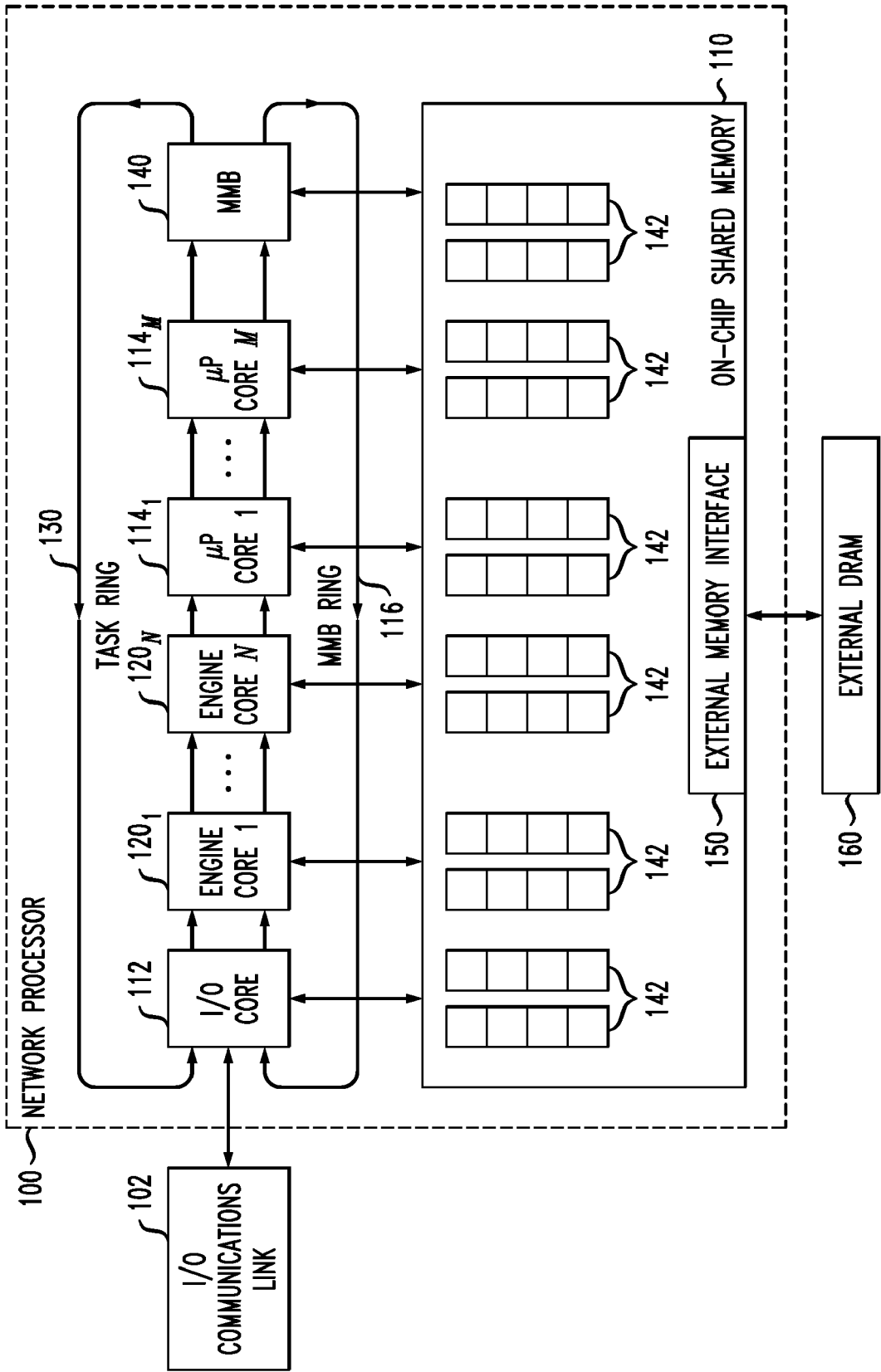
FIG. 1 shows a block diagram of a network communications processor in accordance with exemplary embodiments of the present invention.

FIG. 1 shows a block diagram of an exemplary single-chip network processor system implemented as a system-on-chip (SoC), Network Processor 100. Network Processor 100 might be used for processing data packets, performing protocol conversion, or the like. Reference herein to "one embodiment", "an exemplary embodiment", or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Network processor 100 includes on-chip shared memory 110, one or more input-output (I/O) cores, shown as I/O core 112, one or more microprocessor (μP) cores, shown as μP cores $114_1$-$114_M$, and one or more engine cores $120_1$-$120_N$, where M and N are integers greater than 1. Network Processor 100 also includes task ring 130, memory manager block (MMB) 140, MMB ring 116, and external memory interface 150 for communication with external memory 160. External memory 160 might typically be implemented as a dynamic random-access memory (DRAM), such as a double-data-rate three (DDR-3) DRAM, for off-chip storage of data. In some embodiments, such as shown in FIG. 1, all of the one or more I/O, μP and engine cores, and MMB 140, are directly coupled to shared memory 110. In alternative embodiments, each of the one or more I/O, μP and engine cores, and MMB 140 might not need to be directly coupled to shared memory 110. For example, as described in greater detail with regard to FIG. 2, each of the one or more I/O, μP and engine cores, and MMB 140 (collectively referred to as "cores") might be coupled to a switch system that is then coupled to shared memory 110.

Shared memory 110 might include one or more FIFO queues 142. As discussed in more detail below, one or more FIFO queues 142 might be dynamically allocated in shared memory 110 to the various cores 112, 114, and 120 based on corresponding requests by the cores to MMB 140. Each core might request allocation of memory for additional FIFO queues via MMB ring 116. While, in FIG. 1, task ring 130 and MMB ring 116 are shown coupled to the various cores in an order, one skilled in the art will realize that such order is for illustrative purposes only as an aid to describing the present invention, and any one of the cores might be adjacent to another core along rings 130 and 116. As described herein, the term "adjacent" describes either a previous core or subsequent core on communication rings 116 and 130. For example, in the exemplary embodiment shown in FIG. 1, MMB 140 is adjacent to μP core $114_M$ and I/O core 112.

I/O core 112 might typically be implemented as hardware that connects Network Processor 100 to one or more external devices through I/O Communication link 102. I/O Communication link 102 might generally be employed for communication with one or more external devices, such as a computer system or networking device, that interface with Network Processor 100. I/O Communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in memory 110 and then one or more "tasks" corresponding to the received packets are provided, via task communication ring 130, to one or more of the various cores. As described herein, a task is a command issued between cores to perform processing functions on at least a portion of packet data. Transmitted packets are preferably received from a task and transmitted externally.

Task ring 130 is a communication bus linking adjacent cores together in a serial or "daisy-chain" fashion. In one embodiment, task ring 130 might be a unidirectional ring that passes task control information from a source core to a destination core, and the tasks might contain address pointers to data stored in shared memory 110. As described herein, tasks are instructions to the destination core to perform certain functions. Tasks received by a destination core might be stored in a corresponding one of FIFO queues 142, and the data corresponding to the task to be processed by the destination core might be stored in shared memory 110.

Tasks allow Network Processor 100 to process a wide variety of data and control messages more efficiently than with a fixed pipeline or non-pipelined architecture. As discussed in more detail below, the sequence of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif.

In embodiments of the present invention, a virtual pipeline operates by each core receiving a task, executing that task, and assigning a subsequent task to another (or the same) core depending on the packet or instruction being processed. For purposes here, a core generating a task is referred to as a source core, and a core given a task to execute is referred to as a destination core. Tasks provided to a destination core are written to shared memory 110 by the source core and read from shared memory 110 by the destination core. Task ring 130 provides a communication path for the various cores to pass tasks to each other utilizing messages that contain the address pointers to data corresponding to the task stored in shared memory 110. Although shown in FIG. 1 as a ring bus, it is understood that other topologies other than a ring might be used to pass tasks from core to core, such as direct connections between each of the cores or use of a switch system. As described below, a task data structure might typically include i) an identification of a virtual pipeline for the task, ii) packet specific parameters and engine instructions for the virtual pipeline, iii) inline header and trailer data for the task, and iv) pointers to data stored in memory 110.

Figure 4:
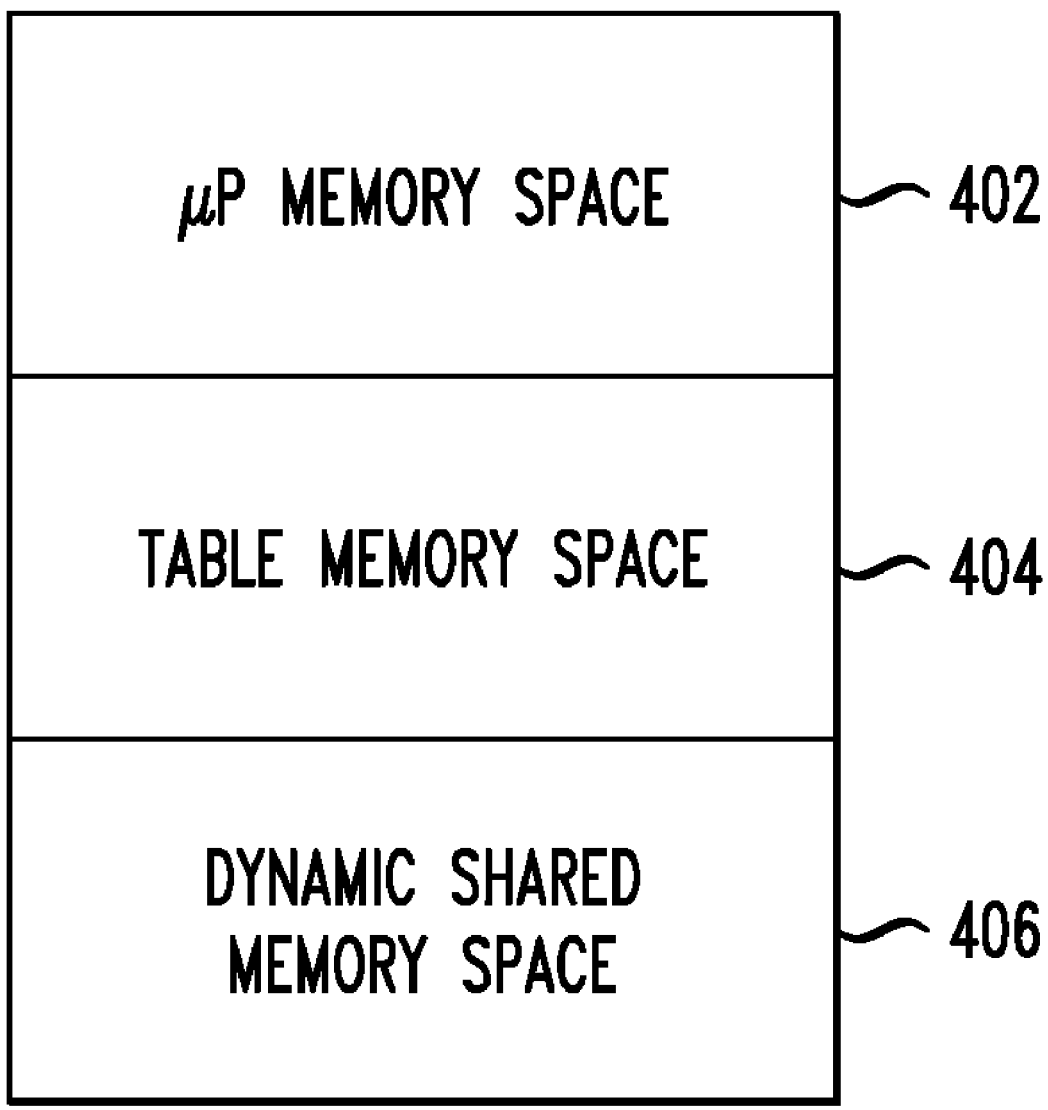
FIG. 4 shows an exemplary subdivision of an on-chip shared memory of the network communications processor of FIG. 1.

In embodiments of the present invention, shared memory 110 is a conventional memory operating as a cache and might be allocated or subdivided. For example, as shown in FIG. 4, shared memory 110 might be subdivided into three areas: processor memory space 402, table memory space 404, and dynamic shared memory space 406. Processor memory space 402 might typically be employed to store all or part of the operating systems and other sets of instructions for μP cores $114_1$-$114_M$, for use during configuration and operation of Network Processor 100. Table memory 404 might typically be employed to store statically allocated data having a relatively fixed size, for example, a table of queue addresses for each of engine cores $120_1$-$120_N$ to access FIFO queues 142, or key tables for an encryption/decryption core (e.g., core $120_1$), etc. Dynamic shared memory space 406 might typically be employed as memory that can be dynamically allocated by MMB 140, for example, FIFOs 142 which are dynamically allocated by MMB 140 to the various engine cores $120_1$-$120_N$ and μP cores $114_1$-$114_M$. Dynamic shared memory space 406 typically stores data, tasks, and other transient data employed by the various cores.

Returning to FIG. 1, external memory interface 150 couples shared memory 110 to external DRAM 160 to provide off-chip storage of data not needed by the various engine cores $120_1$-$120_N$ and μP cores $114_1$-$114_M$ to free space in shared memory 110. Memory management block (MMB) 140 allocates and frees memory resources in shared memory 110. Memory is allocated for such applications as task FIFO storage (e.g., FIFOs 142), packet data storage, hash-table collision handling, timer event management, and traffic manager queues. MMB 140 provides reference counts to each block of memory within shared memory 110. Multiple reference counts allow for more efficient storage of information, such as multicast traffic (data to be sent to multiple destinations) or for retransmission. Multiple reference counts remove the need for replicating the data each time the data is needed. MMB 140 preferably tracks the memory allocations using a stack-based approach since a memory block recently released is preferably the next block to be allocated for a particular task, reducing cache trashing and cache tracking overhead.

Figure 2:
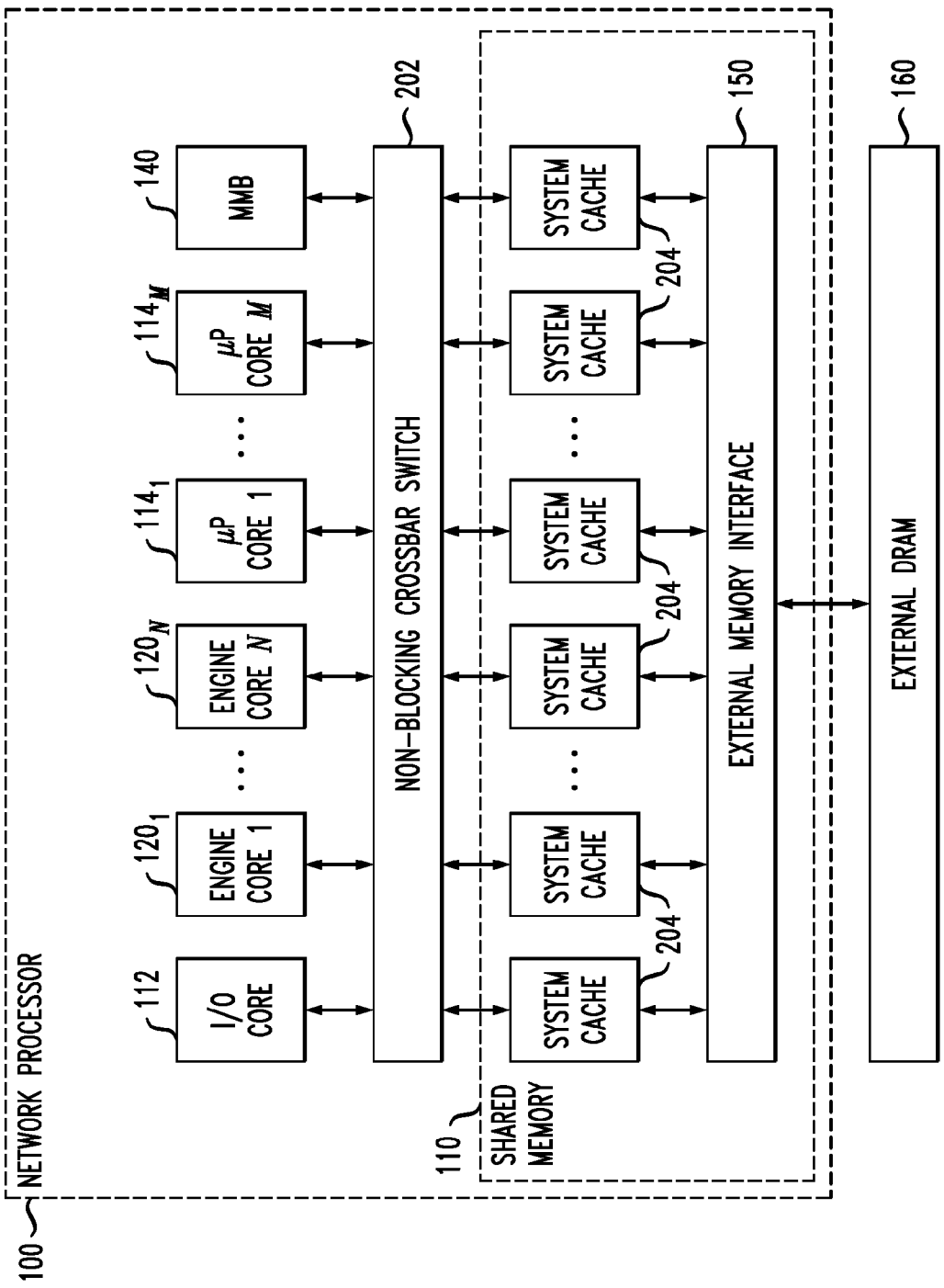
FIG. 2 shows a block diagram of an exemplary embodiment of the network communications processor of FIG. 1.

FIG. 2 is an alternative view of Network Processor 100 of FIG. 1. Like-numbered items perform analogously with those described with respect to FIG. 1 and are not discussed herein in connection with FIG. 2 except as noted. Non-blocking crossbar switch 202 connects cores 112, $120_1$-$120_N$, $114_1$-$114_M$ and MMB 140 to system caches 204 in shared memory 110, and a connection made through non-blocking crossbar switch 202 is considered, for purposes here, a direct connection between a core and the memory 110. Crossbar switch 202 is preferably a non-blocking switch arbitrating memory access priority by the cores. As described in more detail below, system caches 204 are addressed via the crossbar switch in such a way as to balance access to the caches, referred to herein as striping, helping to avoid hot spots in shared memory 110, improve performance of the caching in and out of external memory 160, and reduce cache access bottlenecks. Thus, in embodiments of the present invention, each system cache 204 might form a memory array, and the number of system caches might preferably be implemented as a power of two. Non-blocking crossbar switch 202 might be implemented such as described in the above-identified related U.S. patent application Ser. Nos. 12/430,438 filed 27 Apr. 2009, 12/729,226 filed 22 Mar. 2010, and 12/729,231 filed 22 Mar. 2010.

In embodiments of the present invention, there are three types of "clients" (e.g., types of cores) supported by the crossbar: i) processor cores, ii) I/O cores, and iii) general clients. Processor cores $114_1$-$114_M$ access the system cache via the crossbar and have generally absolute priority to reduce to a minimum latency for the processors that might otherwise suffer from stall cycles when latency increases beyond a threshold.

I/O cores are a type of client that support I/O interfaces, such as I/O core 112, and have medium memory access priority. Allocation of this priority level is important because these types of clients might suffer from underrun/overrun issues when supporting their interfaces. The I/O core clients generally experience higher latency than general processor cores, but lower latency than general clients. However, since the I/O function is generally easy to read-ahead and write-behind, this higher latency for these types of clients causes little or no impact to overall performance. If the maximum latency is bounded, the size of the read-ahead and write-behind required might be determined.

Figure 3:
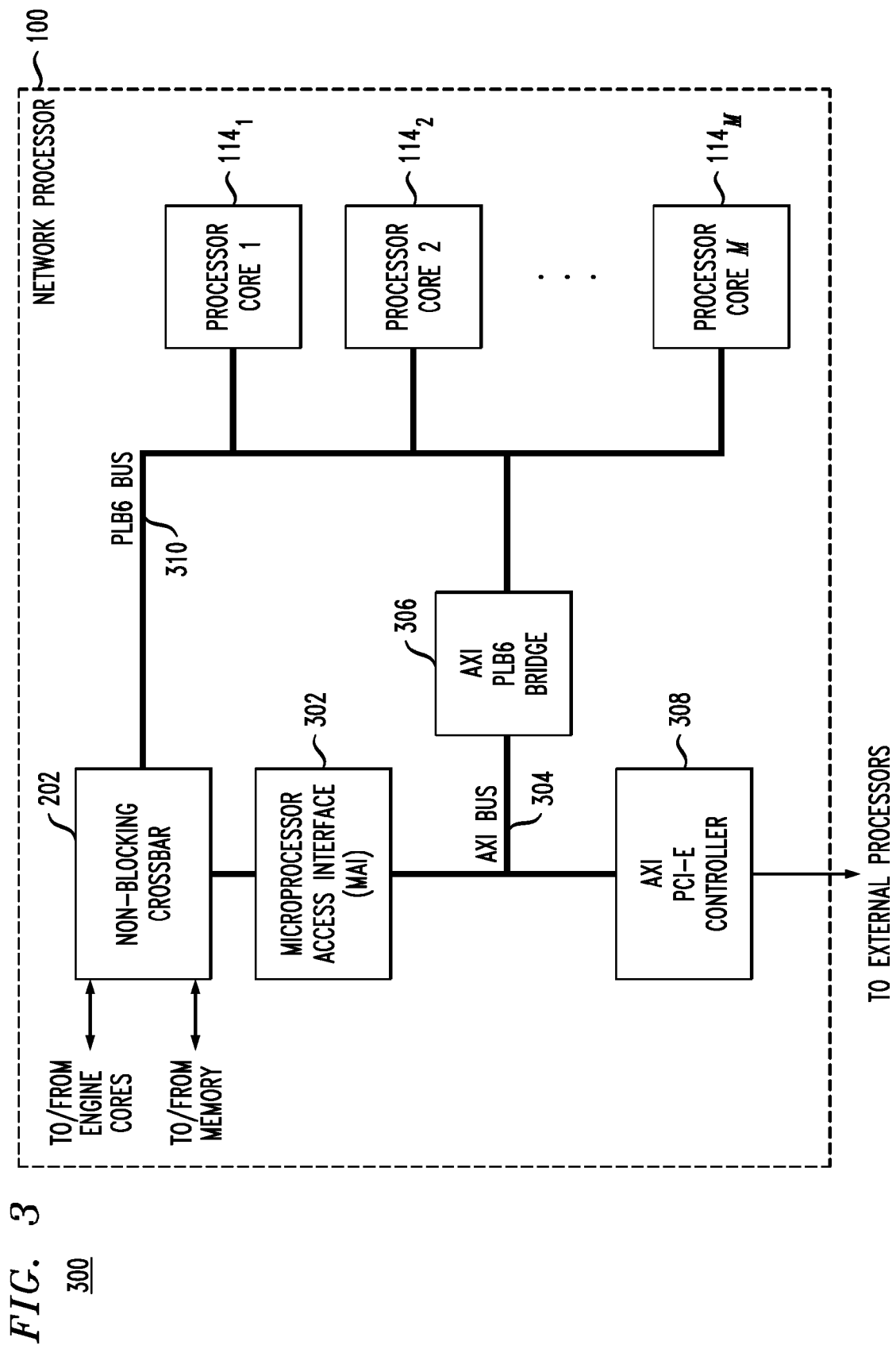
FIG. 3 shows a block diagram of an exemplary communication bus of the network communications processor of FIG. 2.

General clients have the lowest access priority for shared memory 110. General clients might constitute all other modules of Network Processor 100. For example, these modules might be hardware accelerators or special purpose processors. One such special purpose processor, shown in FIG. 3, is Microprocessor Access Interface (MAI) 302. As shown in FIG. 3, MAI 302 might provide a physical bus interface to enable virtual pipeline connections between one or more internal and external processors and non-blocking crossbar switch 202. All general client functions are designed to be tolerant of the memory latency and can tolerate short disruptions in latency without causing performance issues.

MAI 302 is generally performance insensitive to absolute latency. Thus, MAI 302 is typically operated with high utilization at the lowest possible priority value. The I/O core clients are sensitive to memory access latency, but only to having predictable latency. If the memory access latency is bounded, prefetch and write behind might be employed to operate without underrun or overrun. In general, all other memory clients are sensitive only to average latency. In addition, they might prefetch and write-behind to achieve a desired level of performance.

FIG. 3 shows a block diagram detailing an interface 300 between processors $114_1$-$114_M$ and crossbar switch 202. As shown, Network Processor 100 contains one or more microprocessors $114_1$-$114_M$, each of which might include internal L1/L2 caches (not shown). The multiple processors implement cache coherency between themselves as is well known in the art. Cache misses from the processors go across the main system memory crossbar 202 to on-chip shared memory 110 and, if necessary, external memory 160. Interface 300 might also include a standard set of peripheral interfaces (USB, EEPROM, etc., not shown) on or off the chip. For example, as shown in FIG. 3, PCI-E interface 308 might be provided. PCI-E interface 308 allows for any external device operating in conformance with the PCI-E protocol to be attached to Network Processor 100. For example, PCI-E interface 308 might allow one or more external processors to access shared memory 110, task queues 142 and other resources on the chip, such as task ring 130 and MMB ring 116. Thus, the task communication mechanism employed by the internal processors can also be used for message passing between the internal and external processors.

Communication between processors $114_1$-$114_M$ and memory 110 via crossbar switch 202 occurs via two paths, one path for processor instructions requiring latency less than a predefined threshold ("minimal latency") and the other path for other types of information, such as tasks sent via the virtual pipeline, that are not as sensitive to memory latency. Memory access interface (MAI) 302 handles instructions that are less sensitive to memory latency. MAI 302 is an interface between crossbar switch 202 (and memory 110) and the internal processor(s) $114_1$-$114_M$ and any attached processor(s) external to Network Processor 100. MAI 302 provides an interface for different kinds of microprocessors to receive and send tasks like any of the internal cores coupled to shared memory 110.

For example, MAI 302 might be coupled to PCI-E interface 308. As illustrated here, MAI 302 connects to the crossbar 202 for its task-based communications. For processor communications, MAI 302 is coupled to AXI bus 304. The AXI protocol is higher frequency implementation of the Advanced Microcontroller Bus Architecture (AMBA) introduced by ARM Ltd. AXI bus 304 enables MAI 302 to communicate with any peripheral device or processor that supports the AXI protocol. AXI-to-PCI-E controller 308 might be used by MAI 302 to allow external processors to access AXI bus 304. Internal processors $114_1$-$114_M$ access AXI bus 304 via AXI-to-PLB Bridge 306. PLB is a microprocessor bus architecture introduced by IBM. In embodiments of the present invention, processors $114_1$-$114_M$ are Power PC® processors that utilize PLB bus 310 for communication between processors and crossbar 202. AXI-to-PLB bridge 306 allows processors $114_1$-$114_M$ to communicate with AXI bus 304, and thus external processors (via AXI-to-PCI-E controller 308).

Thus, MAI 302, AXI-to-PCI-E controller 308 and AXI-to-PLB Bridge 306 make the architectural design of Network Processor 100 "agnostic" to the chosen processor architecture for processors $114_1$-$114_M$ or any external processors. For example, a given design might employ Pentium® or Power PC® processors, or a combination of different processors, without changing the interfaces to various software modules of Network Processor 100. Pentium® is a registered trademark of Intel Corporation, and Power PC® is a registered trademark of IBM.

As mentioned above, task communication within the architecture of Network Processor 100 is handled by MAI 302. MAI 302 allows the processors to send and receive tasks to and from other processors or other cores within the architecture. MAI 302 is also used for configuration updates. All accesses that MAI 302 makes to µP memory space 406 are fully coherent with the processor receiving or issuing a task. If an external processor supports I/O coherency for PCI-E transactions, then the external processors are coherent as well. All interactions with MAI 302 are non-blocking to the processor and generally involve only local memory updates. Processor overhead is reduced to a few cached memory accesses (no I/O cycles required). Advantageously, MAI 302 allows the programming model might be substantially the same for internal and external CPUs. The programming model might also be substantially the same for special purpose processors, such as digital signal processors.

Multiple task queues (e.g., FIFOs 142 of FIG. 1) for each processor are supported for input, output, and processor configuration. This allows independent access to the queues from different processors or cores. An ordered queue process, described in more detail below, can be used to provide per flow load balancing. Tasks can also be directed to a specific queue.

One component of MAI 302 manages processor addressable FIFO buffers. For outgoing tasks, MAI 302 will copy the data out of the processor-specified buffer quickly. Therefore, the processor will be able to reuse the buffers quickly. The task queues going towards the CPUs can also be quite shallow, for example, the queues might only be deep enough for MAI 302 to have sufficient time to push a next task in to the buffer. Buffer management for task-receive queues, explained in more detail below, is handled by the processor providing MAI 302 with a small set of buffer addresses. This approach might require an extra copy of the data being buffered, but this copy might have only a small performance impact because of the aggregate bandwidth provided by the memory subsystem and the intelligent management of the cache. No extra external memory access cycles will be required for this copy.

Returning to FIG. 1, external memory interface 150 provides a multi-bit interface for external memory 160. Preferably, external memory interface 150 is a standard interface, such as DDR3 (double data rate, version 3). Interface 150 might contain multiple DRAM controllers that accept cycles from multiple system caches 204. In embodiments of the present invention, the system cache number and a hash of the upper bits of the address are used to determine the chip select (when multiple banks of cache are used) and also the bank selects. With the randomized striping across the system caches, as described in more detail below, this has the effect of evenly distributing all cycles across the chip selects and cache banks. This provides a more deterministic DRAM performance than without randomized striping. This, combined with the request priority information provided by the system cache, allows high DRAM utilization with deterministic and consistent performance.

Shared memory 110 is treated as a system-wide cache (shown in FIG. 2 as system caches 204) having conventional cache architecture with a number of extensions. In one embodiment, the cache is an 8-way associative with LRU (last recently used) data eviction to external memory 160. Possible extensions to the cache operation are:

1. Cache line valid might be tracked independently for each half of each cache line.

2. Accesses from processors $114_1$-$114_M$ might be issued speculatively to the system cache. This allows the system cache to start its tag lookup in parallel with the cache coherency operation between the processors.

3. Padded write operations might be provided. Padded write operations are used when data is being written into packet buffers and message FIFOs (not shown) in shared memory 110 to avoid unnecessary reads from external memory 160.

4. Read with invalidate operations might be provided. Read with invalidate operations are used when data is being read for the last time to prevent unnecessary write-backs to the external memory 160 when data is no longer needed.

5. The cache might support two priority levels (in addition to the crossbar priorities). Cache misses from the processors are at high priority levels. Also, I/O cores $120_1$-$120_N$ issue high priority memory requests when the respective read-ahead or write-behind FIFOs (not shown) are nearing a full threshold. This is used to avoid underruns and overruns by the I/O cores. These priority levels affect both the order in which the cache runs operations, but is also forwarded to the external memory controller 150 when an operation requires an external memory access.

To generate the physical address to the striped caches 204 from the logical addresses passed through the crossbar switch 202, a hash calculation based on at least a portion of the logical address is performed to select which of the caches 204 are addressed. In embodiments of the present invention, a single clock cycle hash algorithm was chosen. By using an exclusive-OR of groups of the logical address bits, a hash value is generated to select which portion of memory 110 is accessed. In embodiments of the present invention, memory blocks for caches 204 might be dynamically allocated in one of the following sizes: 256, 2048, 16384, and 65536 bytes. The allocated memory blocks might typically be employed to store packet data. To avoid a bias towards the beginning of the blocks for memory accesses by always storing data starting at the beginning of the block and continuing sequentially into the block, the hash calculation based on at least a portion of the logical address is performed to select which of the caches 204 are addressed.

For example, if there are sixteen caches ($2^4=16$), then the hash algorithm generates a four-bit result. An exemplary four-bit hash algorithm of a 36 bit logical address to a four-bit hash value is $(A(35:32){\char`\^}A(31:28){\char`\^}A(27:24){\char`\^}A(23:20){\char`\^}A(19:16){\char`\^}A(17:14){\char`\^}A(14:11){\char`\^}A(11:8))$ & 0xf, where A(X:Y) are bits X through Y, inclusive, of the logical address, "^" represents the logical function exclusive-OR, and "&" represents the logical AND function. The physical address is a 32-bit value formed by a concatenation of logical address bits 35:12 and bits 7:0, with the hash value used to select one of the sixteen $2^{32}$-entry caches 204. The hash algorithm and the resulting physical address provide sufficiently random mapping of the logical address to the physical address, such that memory hot-spotting and cache-access and external memory access bottlenecks are significantly reduced. For example, to avoid having bias to the beginning of the memory block, memory address bits A(14:11), A(17:14), and A(19:16) might be hashed since these groupings correspond to the address bits just above the bits used to address an individual 2048, 16384, and 65536 byte block, respectively. This approach might be used to define the hash function for 2, 4, and 8 memory arrays in Network Processor 100. In addition, the algorithm uses only simple logical functions and is fast to perform. It is understood that other algorithms, combinations of bits, or hash value sizes might be used for the hashing algorithm.

Special Purpose Engine Core Examples

The μP cores and engine cores (accelerators) illustrated in FIGS. 1 and 2 might be categorized into three categories: i) multi-threaded special purpose processors, ii) software-driven hardware accelerators, and iii) command-driven hardware accelerators. A multi-threaded special purpose processor is preferably designed for processing that is dominated by random sequences of memory accesses. Deep packet inspection and packet classification engines are the best example of processes requiring random memory accesses. A software-driven hardware accelerator is preferably designed for processing that is best handled by hardware accelerators, but benefits from direct software control, such as traffic management and scheduling. Each decision in traffic management can be sequentially dependent on every prior decision. A command-driven hardware accelerator is specially designed hardware that can be directed on a packet-by-packet basis. An example of a command-driven hardware accelerator is a cryptographic engine. Except for the I/O core 112, the following cores are examples of engine cores 120$_1$-120$_N$ shown in FIGS. 1 and 2. A given implementation of Network Processor 100 might include zero or more of each of the following exemplary cores.

I/O core 112 provides I/O interfaces and in exemplary embodiments is a command-driven hardware accelerator that connects the Network Processor 100 to external devices. As described herein, Network Processor 100 might include one or more I/O cores. Received packets are preferably placed in shared memory 110 and then one or more corresponding tasks are sent out. Transmitted packets are preferably received from a task and transmitted externally. Exemplary I/O interfaces include Ethernet I/O adapters providing integrity checks of incoming data. The I/O adapters might also provide timestamp data for received and transmitted packets that might be used to implement features such as timing over packet (e.g., IEEE 1588). In alternative embodiments, I/O cores 112 might be implemented as input (receive) only or output (transmit) only interfaces.

The Modular Packet Processor (MPP) is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread state in memory instead of in register files.

The Packet Assembly Block (PAB) is a command driven hardware accelerator providing a holding buffer with packet assembly, transmit, retransmit, and delete capabilities. An incoming task to the PAB can specify to insert/extra data from anywhere in any assembly buffer. Gaps are supported in any buffer. Locations to insert and extract can be specified to the bit level. Exemplary traditional packet reassembly functions might be supported, such as IP defragmentation and AAL5. The PAB might also support generalized holding buffer and sliding window protocol transmit/retransmit buffering, providing an offload for features like TCP origination, termination, and normalization.

The Modular Traffic Manager (MTM) is a software-driven accelerator that provides packet scheduling and possibly up to six levels of scheduling hierarchy. The MTM might support millions of queues and schedulers (enabling per flow queuing if desired). The MTM might provide hardware support for shaping and scheduling with dual leaky token schedulers and smooth deficit weighed round robin (SDWRR) for every queue and scheduler. The MTM might also support multicasting. As described herein, the multicast facility uses the reference count capabilities of MMB 140 to avoid any unnecessary copies of data. Each copy of a packet is scheduled independently and can traverse down different virtual pipelines. This enables multicast with independent encapsulations or any other processing. The MTM might also contain a special purpose processor that can be used for fine-grained control of scheduling decisions. This processor can be used to make discard decisions as well as scheduling and shaping decisions.

The Stream Editor (SED) is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED becomes the outgoing packet data and can also update task parameters.

The Regular Expression (RegEx) engine is a packet search engine for state-based cross-packet pattern matching. It is multi-threaded accelerator. An exemplary RegEx engine might be implemented such as described in U.S. Pat. No. 7,439,652 or U.S. Patent Application Publication No. 2008/0270342, both of which are incorporated by reference herein in their entireties.

The Security Protocol Processor (SPP) provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is used to load balance across the threads.

The Protocol Integrity Checker (PIC) is a command-driven hardware accelerator that provides CRC/checksum checking and generation features. It might support multiple CRC functions, including software-specified polynomials. It might support IP/UDP/TCP checksums for IPv4 and IPv6. When checking CRCs and checksums, the results are available as output task parameters. When inserting CRCs and checksums, the packet data is modified as required.

The timer manager is a command-driven hardware accelerator that provides support for timers for the processors 114. For example, it receives tasks specifying a timer ID, a timeout value and a tag that will be returned to the software when the timer expires. Timers can be reset and cancelled as well. When a timer expires, a task is sent to the processor with the timer ID and the tag specified. With the task communication mechanism provided by the MAI 302 (FIG. 3), a large number of timers can be managed with low processor overhead.

Tasks and Task Processing

As mentioned above, operations of the cores in Network Processor 100 are controlled using tasks. A task might contain a data packet, but might also contain only commands and metadata. A task is a request from a source entity or source core to a destination entity or destination core for the destination core to perform some processing task. Tasks are communicated via memory-based FIFO queues 142. These queues exist in shared memory 110. The system cache optimization features defined above are used to ensure that task communication does not require frequent access to external memory 160. Embodiments of the present invention provide a distributed messaging facility, for the purpose of avoiding bottlenecks or head-of-line blocking issues, as is often the case with dedicated hardware queues. There is no hardware-imposed limit on the depth (or size) of any task queue (e.g., FIFOs 142). There are software-configured limits that can impose a policy on the depth allowed of any FIFO.

Each task has a priority. In some embodiments, there are eight priority levels but other numbers of priority levels might be provided. A module (e.g., cores $114_1$-$114_M$ and $120_1$-$120_N$) can have multiple input queues. The task priority can be configured to select which queue any given task goes in, or to select a threshold by which a task is rejected, as described in more detail below. This directly supports the commonly known "diffserv" model, of EF/AF/BE (expedited forwarding, assured forwarding, best effort forwarding) packet model. In addition, task queue depths can be used to generate backpressure information. The backpressure information can be referenced by software and by the traffic manager enabling intelligent response to oversubscription cases.

A task is a data structure that preferably contains the following items:
1. Identification of which virtual pipeline this task is on;
2. Packet specific parameters and engine instructions for the virtual pipeline;
3. Inline data (header and trailer); and
4. Pointers to data stored in memory 110.

The following data limitations might be supported in the task structure:
1. Up to 96 bytes of header data and 8 bytes of trailer are inline in the task;
2. Small packets do not require indirect (pointer only) blocks; and
3. Large packets can have editing done to headers and trailers without rewriting packet.

A task can contain only parameter data or only packet data (although, in practice there are some parameters and instructions along with almost every packet). Inline data is used for two different cases. One case is for small packets. For this case, only inline data is used. Another case is where a large packet has had some edits done. In this case and for example, if the changed data is within the first 96 bytes of the packet, the changed part of the data can be put inline and the data pointers updated. A heuristic is used to determine when it is more appropriate to make a copy of the entire packet, or to use the inline data to handle any edits. This ability to edit the packet by adding inline data optimizes several typical cases, including updating IP/UDP/TCP checksums and adding L2 cache headers.

As will be described with regard to FIG. 8, tasks are built using task templates that describe a processing sequence through the chip. Templates are not flow specific, but rather describe a virtual pipeline through the engines. Templates are parameterized, allowing the commands to include not only generic instructions, but also per packet and per flow information. These templates are stored in the cores as described below.

A template merging process creates next task from a combination of incoming task, engine outputs and template itself. This mechanism allows the commands to any given point in the pipeline to come from any prior point in the pipeline (including the launching point). It also allows the pipeline definition to specify parts of the commands, avoiding the need to have all the commands come explicitly with the task.

In exemplary embodiments, virtual pipelines are defined by the software developer. Based upon the virtual pipelines, the run time software produces the templates accordingly. Virtual Pipelines are defined by:
1. For each pipeline, define the sequence of processors to be used.
2. For each processor, the required command fields.
3. For each field, the source module, data output from a previous engine in the virtual pipeline or data that is constant for the pipeline.

For interfacing to the processor cores $114_1$-$114_M$ (e.g., via the MAI 302), the virtual pipeline defines the data sent or received from the processors. In the virtual pipeline definition, these are the fields that are used (instead of hardware defined fields) in a data structure corresponding to the task parameters sent or received via MAI 302.

Exemplary Virtual Pipeline Operations

Figure 5:
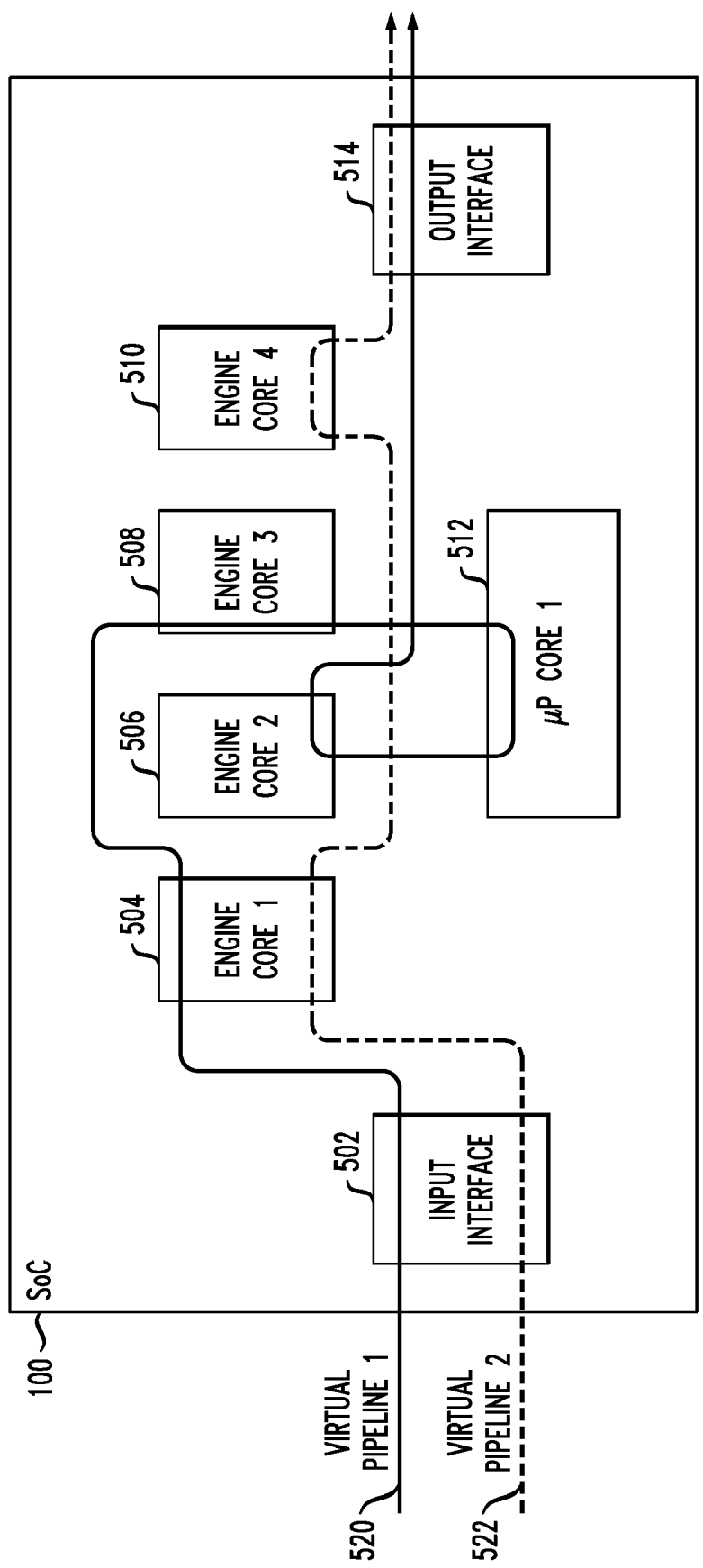
FIG. 5 shows an exemplary data flow of two virtual pipelines through an exemplary network communications processor of FIG. 1.

FIG. 5 shows a flow of two exemplary virtual pipelines through Network Processor 100. FIG. 5 shows a first virtual pipeline sequence 520 for processing an exemplary packet, and a second virtual pipeline 522 for processing another exemplary packet. As shown in FIG. 5, virtual pipeline 520 defines a processing order starting at input interface 502 (such as the I/O core 112 of FIG. 1), engine core 504, engine core 508, processor core 512, engine core 506, and finally output interface 514. However, another packet received by the input interface 502 might be processed in accordance with second virtual pipeline 522. As shown in FIG. 5, virtual pipeline 522 also defines a processing order starting at input interface 502 and engine core 504 but then proceeds to engine core 510 and then output interface 514. Processor core 512 and engine cores 506 and 508 are not included in virtual pipeline 522. Because only those cores that are required are included in a virtual pipeline, Network Processor 100 has increased efficiency of processing data packets. Each engine core includes template tables describing the task parameters and task format for processing by the next engine for each task on a given virtual pipeline, and which task parameters are consumed by the current engine. In an exemplary embodiment of the present invention, engine core 504 might be a packet classifier that parses incoming packet and determines what tasks (virtual pipeline) are to follow for a given packet. Engine core 506 might be a scheduler that transmits outgoing task according to configured schedule parameters. Engine core 508 might be a decryption engine that decrypts packet prior to sending it to processor core 512. Engine core 510 might be a data packet modifier that updates packet data before sending it out via output interface 514.

Other exemplary virtual pipeline operations include a processor-only model, accelerator-only, pre-processing, post-processing, and fast path models. In a processor-only model, packets from I/O core 112 are sent straight to MAI 302 and a processor core processes them. Resulting packets are sent out via MAI 302 to I/O core 112. In this exemplary processor-only model, I/O core 112 and MAI 302 might be employed as an optimized I/O interface.

The accelerator-only model, similar to the non-pipelined prior art network processor architecture, uses the acceleration functions in a non-pipelined fashion. This can be used for a processor to use the SPP accelerator or RegEx accelerator in a traditional co-processor model.

The pre-processing model is focused around identifying parts of the packet that can be handled before the packet is processed on a general purpose processor. Some examples of things that are typically handled in a pre-processing model are:

1. State-based packet classification
2. IP de-fragmentation
3. TCP assist/offload
4. Rate shaping
5. Decryption (e.g., IPS/Kasumi/Snow3G)
6. RegEx processing With pre-processing, a packet arrives at the processor, skipping over the steps that are already completed. For example, in IPS applications, the MPP core performs flow classification and then the PAB core performs IP defragmentation and TCP normalization. Once the TCP data stream is normalized, it is then sent through the RegEx core, and the resulting packet with RegEx conclusions is sent to the processor for the actual packet processing. Another example would be to perform the decryption of IPS tunnels before sending the packet to the processor.

The post-processing model is analogous to the pre-processing model. In the post-processing model, steps that occur at the end of packet processing are identified and when the processor sends out a packet, these steps are performed. These steps are skipped at the end of normal processing. Some examples of things that can be handled via post-processing are:

1. Scheduling/shaping
2. Encryption
3. Checksum/CRC generation
4. IP fragmentation
5. Multi-cast The fast path model is useful for packets that can be handled completely outside of the processors $114_1$-$114_M$. For example, a virtual pipeline flow might start out in the pre-processing/post-processing model, but then the software running in a processor determines that a given flow does not require the processing by a processor $114_1$-$114_M$ and then switches the flow to the fast path. One example of this from an IPS application would be to have a processor determine that a given TCP session is transferring video data (which would not need any additional IPS processing). Once that determination is made, the MPP core classification can be updated so that any future packets for this flow stay entirely in the engine cores. In this case, the combination of what would have been the pre-processing and post-processing are connected together (using a different virtual pipeline) and packets from this flow do not consume any further processor cycles.

Task Management

Figure 6:
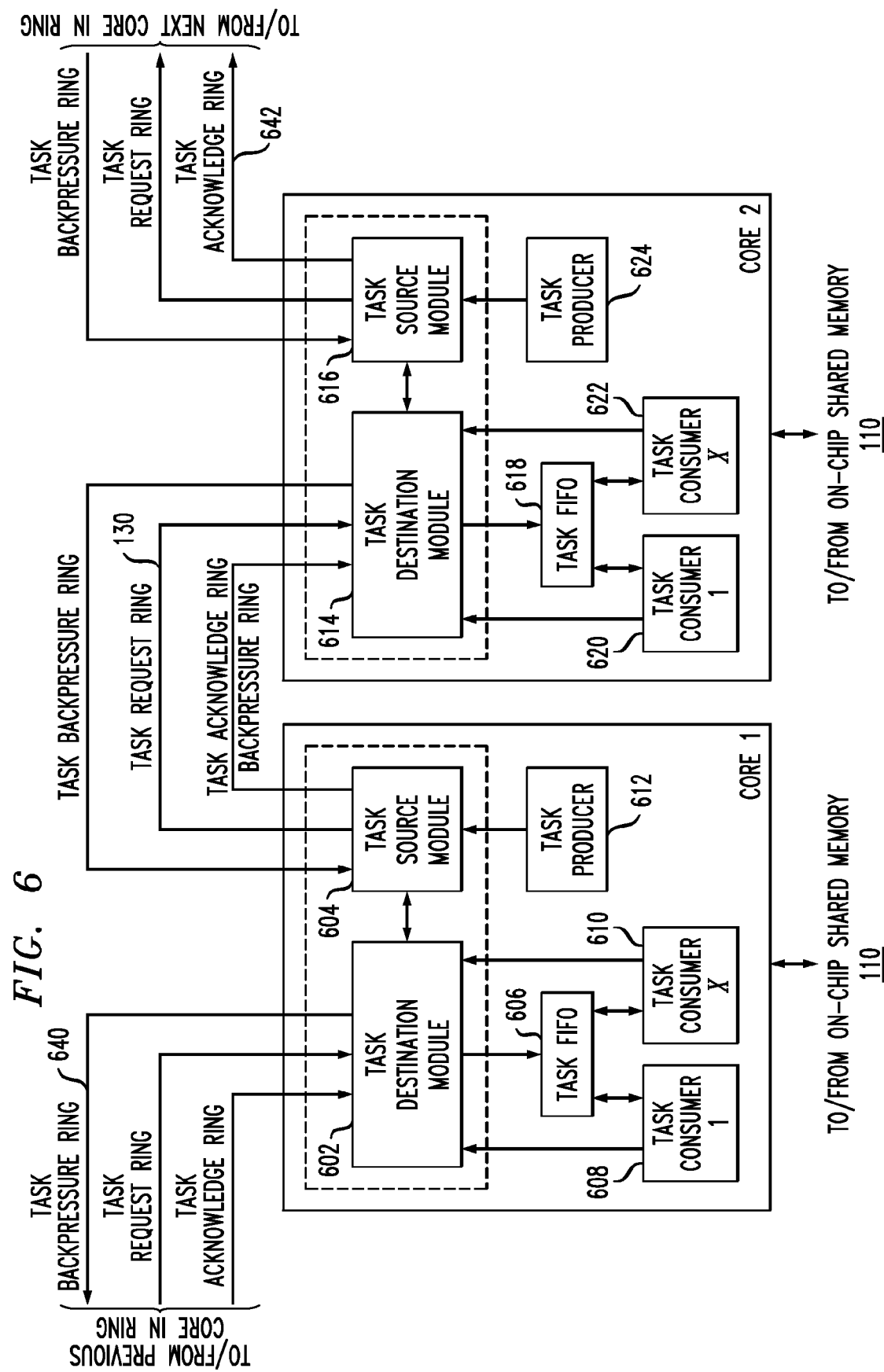
FIG. 6 shows a block diagram of exemplary cores of the network communications processor of FIG. 1.

FIG. 6 shows a block diagram of exemplary task ring managers for each core of the network communications processor of FIG. 1. As shown in FIG. 6, each core includes a task ring manager that includes two register stages: an input register stage (Task Destination Module 602) and an output register stage (Task Source Module 604) for commands on the task ring. The task destination modules 602 and 614 accept incoming tasks, maintain pointers for the task queues in the corresponding core, and pass received tasks to task consumers 608, 610, 620, 622 through task FIFOs 606 and 618. Task source modules 604 and 616 accept tasks from task producers 612 and 624, store the tasks in a temporary buffer (not shown) and send them out on task ring 130. Task Destination Module 602 stores the task command sent from a previous module on the ring and Task Source Module 604 stores the task command that needs to be sent to a next module on the ring. Task Source Module 604 can insert a task command on the ring if the input register either has an empty slot or if the input register has a task command whose destination is this module.

If the input register has a task command that is not for this module, the module should copy this command on to its output register stage. There is an interface between the task destination module and the task source module that is used to pass an incoming task to the output of the task manager, for example to provide memory access for the task source module for task dropping, described below. Should too many requests be received for a core (a destination core) to process or the queues for the core are reaching a maximum, a backpressure is sent on task backpressure ring 640. When a core that is issuing tasks (a source core) receives a backpressure signal propagated along task backpressure ring 640, that source core should stop issuing further task requests on task ring 130. In this example, each core has four holding buffer locations that are used to store requests and allow responses to flow during request backpressure. The holding buffers are used only when task flow control is active.

A source core, for example core 1 or a core prior to core 1 on the ring, sends a task to a destination core, here core 2, by sending a task request signal or message on task request ring 130. Core 2 sends a response to core 1 on task request ring 130 that indicates an address to write the task, and core 1 appends the task data structure to input task FIFO queue 618 of core 2. Core 1 then sends an acknowledge signal that the write is complete on task acknowledge ring 642. Multiple cores can append tasks to the same input FIFO simultaneously to form a fully distributed system for the purpose of avoiding bottlenecks. In exemplary embodiments, the FIFO management structure supports one task enqueued per clock cycle in aggregate, which is a high enough rate where the task management mechanism is generally not considered to be a bottleneck.

Figure 7:
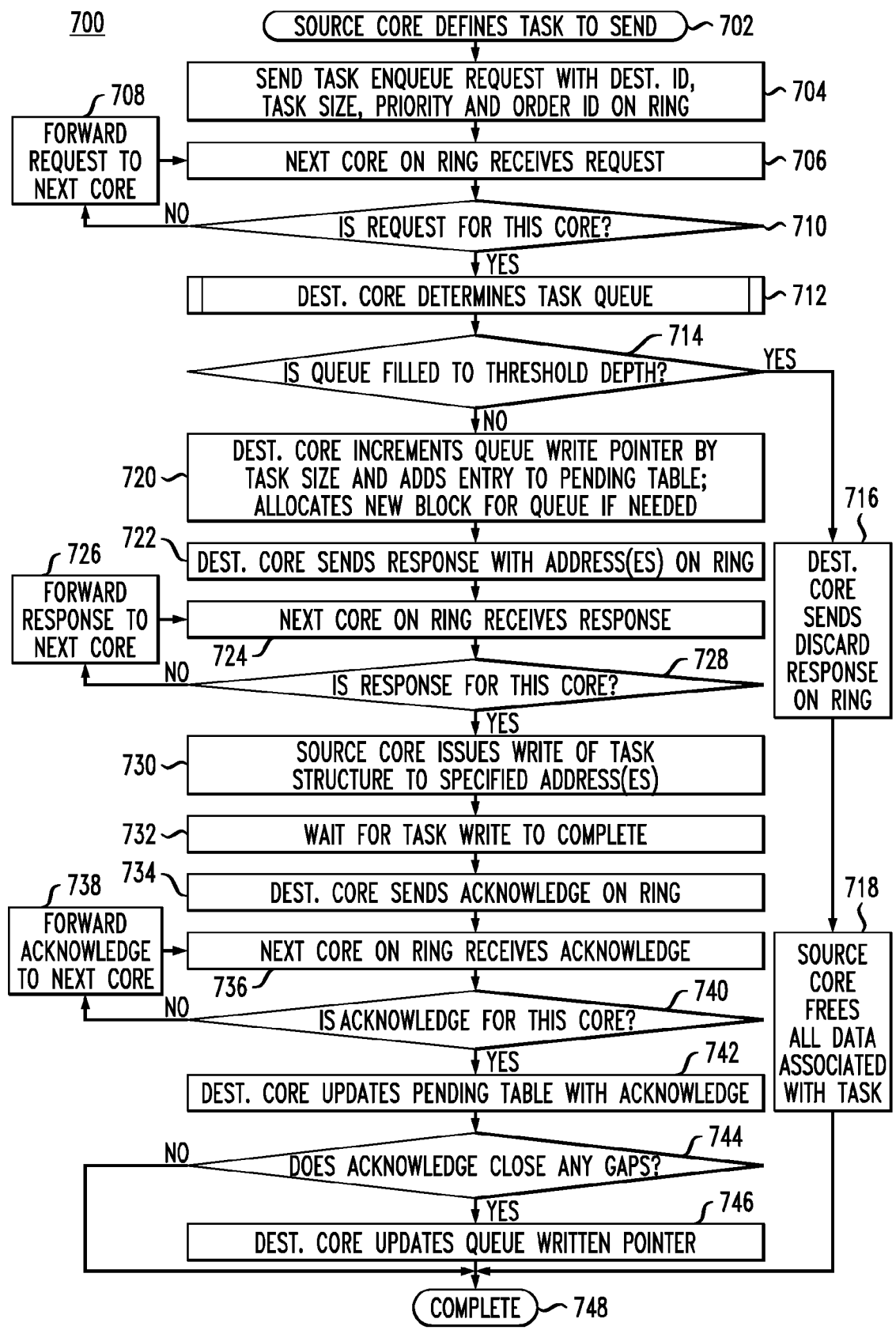
FIG. 7 shows a flow diagram of an exemplary process for sending tasks between one or more cores of the network communications processor of FIG. 1, in accordance with embodiments of the present invention.

FIG. 7 shows a flow diagram of an exemplary process 700 for sending tasks between one or more cores of the network communications processor by appending to one of its input task queues a message via task ring 130. Messages are used to manage the memory locations in shared memory 110 to write the tasks. At step 702, a source core defines a task to be performed by a destination core and, at step 704, the source core sends a task request around the ring with the ID of the destination source and the size of the relevant task. The task request might also include additional data, such as a priority indication and order ID. The task request moves from core to core along task ring 130 until the destination core receives the request, as illustrated in steps 706-710. At step 712, the destination core determines which of its task queues is to store the task, as will be discussed in more detail below. If, however, at step 714 the destination queue is determined to be filled beyond a threshold depth if the task is accepted, at steps 716 and 718 the designation core effectively instructs the source core to discard the task and the associated task data. Steps 716 and 718 might typically include similar communication ring steps such as illustrated in steps 706-710. If the queue will not be filled beyond the threshold depth, then at step 720 the source core increments a queue write pointer by the task size, adds an entry to a table of pending tasks and allocates new blocks of memory for the task queue, if needed.

At step 722, the destination core responds to the source core with the memory address at which to write the new task, and the response propagates along the task ring until reaching the source core in steps 724-728. At steps 730 and 732, the source core then writes the task at the specified address and responds to the destination core with an acknowledgement on the task ring at step 734. The acknowledgment indicates to the destination core that the task data is now ready. The acknowledgement propagates around the task ring until the source core receives the acknowledgement at steps 736-740, and at step 742, the destination core updates a table of pending tasks with the acknowledgement. Because there might be several tasks being written in a given queue at any time, the queues are able tolerate gaps in the queue if a later arriving task complete a write to cache before the earlier task finishes writing the queue. To handle this, at step 744, the destination core manages the fact that there could be several of these task writings in process at a time by checking to see if any of the gaps are closed when the acknowledgement is sent. Then, at step 746, the destination core updates a pointer (a "written" pointer that, when it does not equal a write pointer, indicates that a gap exists in the queue). The destination core then simply reads the next task from a simple FIFO queue. At step 748 the task transfer is complete.

Figure 8:
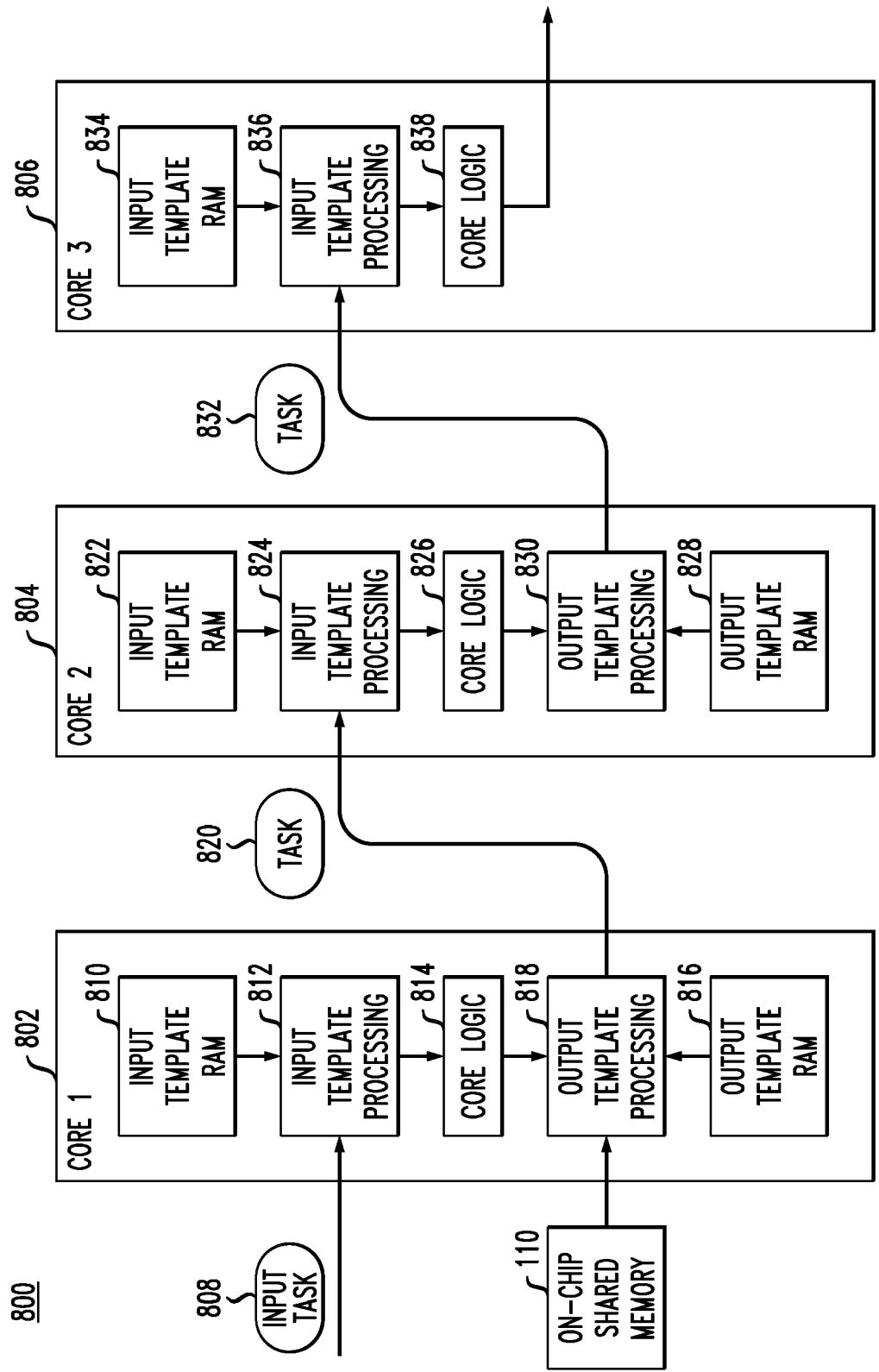
FIG. 8 shows a block diagram of an exemplary flow of tasks between one or more cores of the network communications processor of FIG. 1, in accordance with embodiments of the present invention.

FIG. 8 shows a block diagram of an exemplary flow of tasks between one or more cores and task template processing such as described with regard to FIG. 7. Shown in each of the cores are templates stored therein that are used to interpret fields in a received task or set the contents of a task being sent out. As shown here, input templates are stored in memories 810, 822, and 834 located in each core 802, 804 and 806, respectively. For example, input task template processing block 812 receives an input task 808 and the template stored in memory 810 is used by template processing block 812 to interpret input task 808. A template identification field (templateID) in the task is used to address a template memory. Core logic block 814 processes the task and, if a subsequent task is needed to further process, for example, a packet, core logic 814 requests a new task that output template processing block 818 formats in accordance with an output template stored in memory 816 located in core 802 and is addressed by the same templateID used to address the input template memory 810. Static parameters for output template processing block 818 in core 802 might be stored in shared memory 110.

Static parameters are typically stored in table memory space 404 (FIG. 4), as described above. The static parameters might include multiple template tables, all same-sized entries being stored in the same table. The task source core, for example core 802, addresses the template static parameters by generating the template type and an index. The type selects a base register that points to the first entry in the table. The index is used to get the particular set of parameters needed by output template processing block 818. There might be more than one input task template stored in memory 810 and more than one output template stored in memory 816 although, depending on the type of core, there might not be an input template processing (e.g., in an packet receive-only core) or output template processing (e.g., a packet transmit-only core such as core 806) and the associated hardware removed. Which template is selected for a given task depends on the type of task and the destination core for the task. These templates are defined by configuration software and data loaded when Network Processor 100 is initially programmed and might depend on the type of packet or data being processed by a given core at a given time.

In exemplary embodiments, a source core that writes a task to a destination core might use special cache operations that do not require reads of the external memory 160. In this instance, the destination core invalidates the cache lines as it reads data out of the queue. With the typical task queue being relatively shallow, it is possible that no accesses of external memory 160 are required. However, it might be desired to allow task queues to get sufficiently deep to handle oversubscription, for example, there is no intrinsic limit to the depth of the cache.

Figure 9:
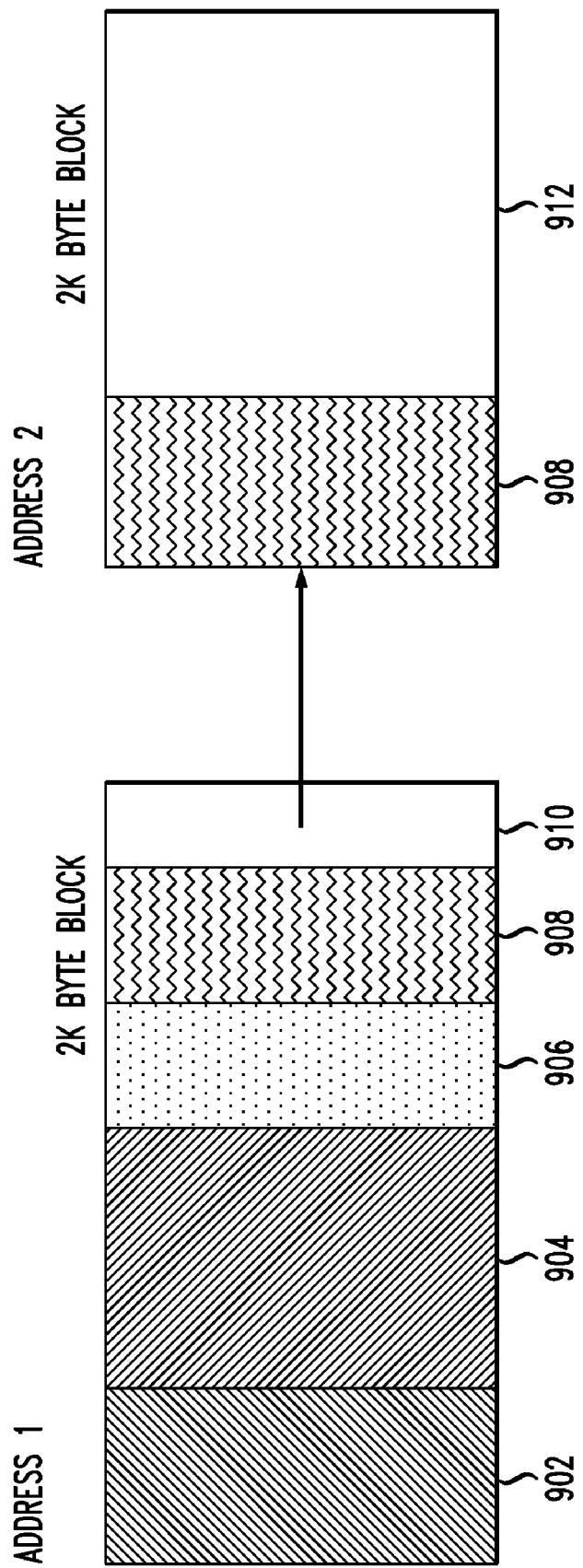
FIG. 9 shows a block diagram of a task queue structure, in accordance with embodiments of the present invention.

FIG. 9 shows a block diagram of an exemplary task queue structure of a destination core. As shown in FIG. 9, a first task 902 from one of the cores (a source core) is stored in the queue, beginning at Address 1. Task 902 is followed by a second task 904 and a third task 906. Tasks 902-906 might be from any of the cores of Network Processor 100. Task 906 is followed by a fourth task 908. However, task 908 exceeds a memory boundary of the first memory block of queue 900. In exemplary embodiments of the present invention, the memory boundary of each block is 2 kB. Thus, as a source core writes task 908 to the queue, the source core appends data 910, which provides a pointer to a next, linked, block of memory where the remainder of the fourth task is stored, starting at Address 2. Empty space 912 in the second block is available for additional tasks to be stored therein.

As mentioned above, each core might have multiple (thousands for some cores, such as I/O core 112) task queues associated therewith. In this case and as discussed in connection with step 712 in FIG. 7, assigning a task to a particular queue depends on several factors, such as whether the queues are ordered queues, the number of tasks in a given queue, and the size or depth of the queue. Ordered task queues support parallel processing of packets while keeping packets from a given flow in order. An ordered task queue is a virtual queue that maps to a set of real queues. Tasks are sent to a virtual queue, and then the task management system determines which real queue the task should be placed into. For packets going to a processor core, virtual queuing enables parallelism and threading of the application code. Ensuring that a single flow is never in more than one processor at a time enables the creation of software without "spin locks" or other complex sequencing operations. This is also used for the cryptographic SPP core and deep-packet inspection (RegEx) cores, enabling the use of multiple hardware threads. For the SPP, this is needed because a packet from a given flow cannot be started until the previous one has completed. Without this kind of load balancing, only a single thread could be used, limiting performance. The deep packet inspection has the same characteristic when doing cross packet inspection.

The mechanism used for the ordered task queues can be described as dynamic flow pinning and is illustrated in FIG. 10. When a task arrives, flow ID 1008 is checked to see if any of the physical queues, shown as queues 1002 and 1004, already include flow ID 1008. If the flow ID is in a physical queue, then the new task must be placed in the same queue. If the flow ID is not in any physical queue, then the new task is placed in the least loaded queue. The definition of least loaded might be chosen to be based either on i) the number of tasks in the queue or ii) the total amount of packet data represented by those tasks. The number of tasks is used when the work per task is constant. The number of bytes is used when the work per task varies with the packet size.

In embodiments of the present invention, ordered task queues are managed by generating a hash function of the flow ID. The hash function is used to index a table that specifies which physical queue a given task is in. The flow ID is determined from data in the task parameters. The determination of which data from the task parameter is defined by the virtual pipeline templates discussed above. The hash described herein offers acceptable performance since, in the instance of a hash value collision, it is acceptable for two different flows to have the same hash value for the purpose of ordering, so long as a single flow is always recognized such that ordering is maintained.

FIG. 11 shows a flow diagram of an exemplary ordered queue task determination and assignment process. These steps expand the function of step 712 of FIG. 7. A task received by the destination core at step 1102 is to be written into one of several queues associated with the destination core. At step 1104, the destination core checks the order identification, Order ID, of the task and, at steps 1106 and 1108, a hash of the ID is performed to index a table that specifies which physical queue to check whether a task with the same ID is already queued. If another task with the same Order ID was found in one of the queues, then at step 1120 the task is written into the same queue to maintain task flow order. If, however, at step 1108 no task having the same Order ID was found to be in a queue, then it might be desirable to balance the task queues by assigning the task to a queue that is least loaded. Based on the type of task as determined in step 1112, if the task has data associated therewith then the task is written into the queue that has smallest amount of data (step 1114) or, if the task is a non-data task then task is written into the queue with the fewest tasks therein (step 1116). Lastly, the Order ID of the written task is added to the queue table in step 1118. The virtual queue mechanism also supports unordered task queues. These are virtual queues that provide load balancing where no flow ordering is required or possible (e.g., when there is no flow ID at all).

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. In a memory system comprising a plurality of hardware engines, the hardware engines coupled to (i) at least one unidirectional ring bus, and (ii) a plurality of addressable memory arrays, a method of accessing data in the arrays, the method comprising the steps of:

sending, by a source one of the plurality of hardware engines, a task message over the at least one unidirectional ring bus to an adjacent hardware engine coupled to the ring bus, the task message having a corresponding one or more destination hardware engines;

iteratively:

checking, by the adjacent hardware engine, whether the hardware engine is a destination hardware engine for the task message and, if not, passing the task message unchanged to a next adjacent hardware engine coupled to the ring bus, thereby passing the task message from the source hardware engine to each corresponding destination engine on the ring bus;

reading, from the received task message by the corresponding one or more destination hardware engines, a logical address of data in the addressable memory array to be accessed;

computing, by the destination hardware engine, a hash value based on at least a part of the logical address;

selecting one of the plurality of addressable memory arrays based on the hash value; and accessing the data in the selected addressable memory array using a physical address based on at least part of the logical address not used to compute the hash value.

2. The method of claim 1, wherein the step of computing the hash value is completed in one clock cycle.

3. The method of claim 1, wherein the plurality of addressable memory arrays comprises at least a power of two addressable memory arrays.

4. The method of claim 1, wherein at least a portion of the addressable memory arrays are organized into caches.

5. The method of claim 1, wherein the hash value is generated to provide random selection of each of the addressable memory arrays.

6. A memory system comprising:

a plurality of hardware engines the hardware engines each coupled to (i) at least one unidirectional ring bus, and (ii) a plurality of addressable memory arrays;

each hardware engine configured to:

send a task message over the at least one unidirectional ring bus to an adjacent hardware engine coupled to the ring bus, the task message having a corresponding one or more destination hardware engines;

check, upon receiving a task message, whether the hardware engine is a destination hardware engine for the task message and, if not, pass the task message unchanged to a next adjacent hardware engine coupled to the ring bus, whereby the task message is passed from the source hardware engine to each corresponding destination engine on the ring bus;

read from the task message, if the hardware engine is a destination engine for the task message, a logical address of data in the addressable memory array to be accessed by the destination hardware engine;

generate a hash value based on at least a part of the logical address;

select one of the plurality of addressable memory arrays based on the hash value; and access the data in the selected addressable memory array using a physical address based on at least part of the logical address not used to compute the hash value.

7. The memory system of claim 6, wherein the hardware engine is configured to generate the hash value in one clock cycle.

8. The memory system of claim 6, wherein the plurality of addressable memory arrays comprises at least a power of two addressable memory arrays.

9. The memory system of claim 6, wherein the hash value is configured to provide random accesses by the circuit of each of the addressable memory arrays.

10. The memory system of claim 6, wherein the memory system is implemented in a network processor.

11. The memory system of claim 10, wherein the network processor is implemented in an integrated circuit chip.

12. The memory system of claim 10, wherein each of the plurality of addressable memory arrays of the memory system are coupled to one or more processing cores of the network processor by a non-blocking crossbar switch.

* * * * *